(12) United States Patent
Gaynier et al.

(10) Patent No.: US 7,983,050 B2
(45) Date of Patent: Jul. 19, 2011

(54) PLUGGABLE SYSTEM FOR READING INPUTS, CONTROLLING OUTPUTS AND COMMUNICATING WITH ANOTHER MODULE FOR POWER DISTRIBUTION UNIT

(75) Inventors: John M. Gaynier, Carleton, MI (US); Alexander Eyhorn, Waterford, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 795 days.

(21) Appl. No.: 11/778,819

(22) Filed: Jul. 17, 2007

(65) Prior Publication Data

US 2009/0021919 A1      Jan. 22, 2009

(51) Int. Cl.
*H05K 7/00* (2006.01)
(52) U.S. Cl. .................. 361/728; 361/763; 361/794
(58) Field of Classification Search .................. 361/728, 361/752, 790, 800, 600, 679.01, 748, 760–761, 361/763, 784, 792, 794, 825, 826; 372/39, 372/43.1, 46.01; 257/183; 250/200, 206, 214, 363
See application file for complete search history.

(56) References Cited

U.S. PATENT DOCUMENTS

| | | | | |
|---|---|---|---|---|
| 6,884,090 B2* | 4/2005 | Kubota | ........................ | 439/76.2 |
| 7,381,065 B2* | 6/2008 | Ikeda et al. | ................... | 439/76.2 |
| 7,649,731 B2* | 1/2010 | Parrish | ........................ | 361/624 |
| 2002/0159225 A1* | 10/2002 | Takahara | ...................... | 361/679 |

* cited by examiner

*Primary Examiner* — Hung S Bui
(74) *Attorney, Agent, or Firm* — Ralph E. Smith

(57) ABSTRACT

An electronics module for automotive vehicles includes a housing; an electrical connector having a commercial standard electrical connector footprint mounted on the housing; and an electronics assembly including commercial standard communication bus electronics contained in the housing, the electronics assembly being electrically connected to the electrical connector. The electronics module is adapted to be plugged into a power distribution unit of an automotive vehicle in order to control power distribution components of the unit.

8 Claims, 11 Drawing Sheets

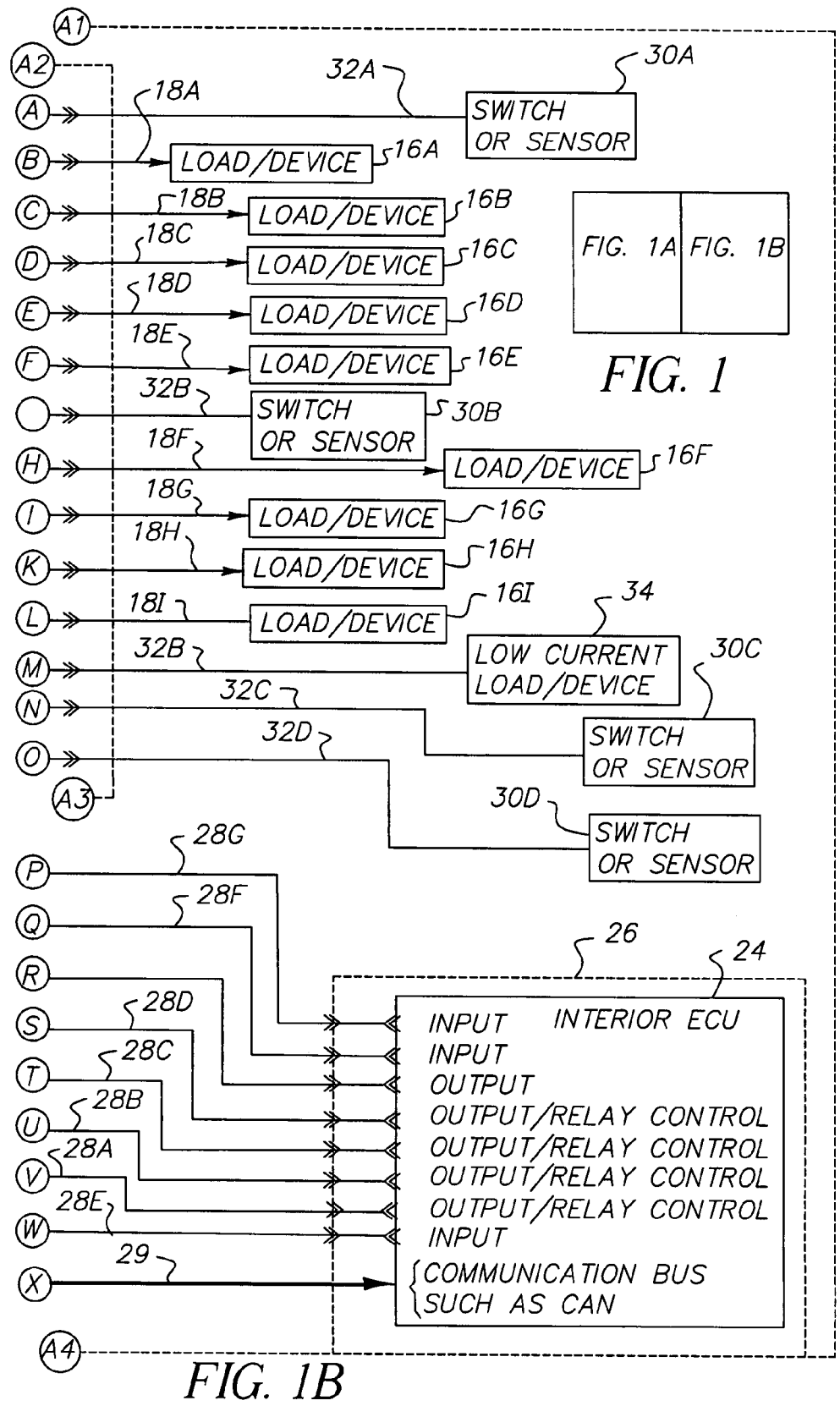

US 7,983,050 B2

PLUGGABLE SYSTEM FOR READING INPUTS, CONTROLLING OUTPUTS AND COMMUNICATING WITH ANOTHER MODULE FOR POWER DISTRIBUTION UNIT

FIELD OF THE INVENTION

This invention relates in general to power distribution and control for use in an automotive vehicle and relates, more particularly, to a pluggable system which plugs into or attaches to another component, such as a power distribution unit, for reading inputs, control outputs, make decisions, and communicate with another module via a LIN (Local Interconnect Network) or similar commercial standard bus.

BACKGROUND OF THE INVENTION

Modern automotive vehicles employ increasing numbers of electrically powered equipment systems. Examples of these systems include the engine control system,(e.g., automatic transmission, brakes, traction control, steering, suspension, air conditioning), the signaling and accessory system (e.g., lights, horn, instrument panes indicators, service monitor systems, radio), and various motors (e.g., power seats, power windows, door locks, trunk lids, windshield wipers and washers). Supplying these systems with the necessary levels and amounts of electrical power has become increasingly complex and difficult. The power distribution system typically includes a housing that houses several components, such as, microprocessors, solid state drivers, printed circuit boards, wiring, diodes, resistors, capacitors, fuses, relays, and the like.

FIG. 1 is a schematic diagram of a segment of a power distribution system used in an automotive vehicle that illustrates such complexity. As shown, engine compartment 10 includes a power distribution unit 12, (such as a fuse box, relay box, power distribution center, junction block), mounted in engine compartment 10. Unit 12 includes a plurality of relay or driver units 14A-14I which produce outputs to load/devices 16A-16I, located outside of unit 12, by means of electrical conductors 18A-18I. Engine compartment ECU 20 produces output/relay control signals transmitted over electrical conductors 22A-22E to respectively control relay or driver units 14A-14E. Interior ECU 24 located in the interior 26 of the vehicle produces output/relay control signals transmitted over electrical conductors 28A-28D to respectively control relay or driver units 14F-14I. Unit 12 also receives signals form switch or sensor units 30A-30D over electrical conductors 32A-32D and transmits the signal from unit 30A to ECU 20 over electrical conductor 22F and the signals from units 30B-30D to ECU 24 over electrical conductors 28E-28G. ECU 24 also produces an output signal transmitted over electrical conductor 28H to unit 12 and from unit 12 over electrical conductor 32E to low current load/device 34. Unit 12 may include a printed circuit board, be hard wired, or utilize other technology or a combination. In FIG. 2, electronics unit 36 includes a printed circuit board with appropriate electronic components and sealing for carrying out the functions of unit 36. Unit 36 communicates with ECUs 20 and 24 and other ECUS over bus system 29'.

In FIG. 1, a communication bus 29 (such as a CAN bus), connects ECU 20 and ECU 24 together and with other ECUs. Electrical conductors 22A-22F and 28A-28G can be hard-wired to unit 12 devices or can be terminated by an electrical connector plugged into unit 12. The complexity of the wiring in FIG. 1 and having a printed circuit board as in FIG. 2 in unit 12 are disadvantageous. The extensive wiring in FIG. 1 is labor intensive. The printed circuit board in unit 12 can be degraded by the heat generated by the electrical power components mounted in unit 12. Moreover, the printed circuit board in unit 12 raises the need for sealing or partially sealing the power distribution unit.

There is thus a need for a solution to these problems.

SUMMARY OF THE INVENTION

According to the invention there is provided a solution to the problems of the prior art.

According to a feature of the present invention there is provided:
an electronics module for automotive vehicles comprising:
a housing;
an electrical connector having a commercial standard electrical connector footprint mounted on said housing; and
an electronics assembly including commercial standard communication bus electronics contained in said housing, said electronics assembly being electrically connected to said electrical connector;
wherein said electronics module is adapted to be plugged into a power distribution unit of an automotive vehicle in order to control power distribution components of said unit.

According to another feature of the present invention there is provided:
a power distribution system for automotive vehicles comprising:
a power distribution unit containing power distribution components, such as fuses, relays, and the like;
an electronics module including:
a housing;
an electrical connector having a commercial standard electrical connector footprint mounted on said housing;
an electronics assembly including commercial standard communication bus electronics contained within said housing, said electronics assembly being electrically connected to said electrical connector; and
an electrical connector mounted on said power distribution unit into which said electronics module is plugged and to which said power distribution components are electrically connected.

The present invention has the following advantages, among others.

1. The need for special tooling is reduced since standard electrical component housings and connector footprints are used.

2. The need for a specially designed circuit board in the fuse/relay box/power distribution center unit is eliminated, allowing the utilization of the most cost effective construction such as metal frets, wire or bus bars, and standard connections.

3. The need for a sealed or partially sealed fuse/relay box/power distribution center unit is reduced.

BRIEF DESCRIPTION OF THE DRAWINGS

In order to appreciate the manner in which the advantages of the invention are obtained, a more particular description of the invention will be rendered by reference to specific embodiments thereof which are illustrated in the appended drawings. Understanding that these drawings only depict preferred embodiments of the present invention and are therefore to be considered to be limiting in scope, the invention will be described and explained with additional specificity and detail through the use of the accompanying drawings, where like numbers are used for like elements, where appropriate.

FIG. 1, as presented in combined FIGS. 1A and 1B, is a schematic diagram of a hardwired fuse/relay box/power distribution center system for use in an automotive vehicle.

FIG. 2, as presented in combined

FIG. 3, as presented in combined

FIG. 6, as presented in combined

FIG. 7, as presented in combined

DETAILED DESCRIPTION OF THE PREFERRED EMBODIMENTS

Figure 1A:
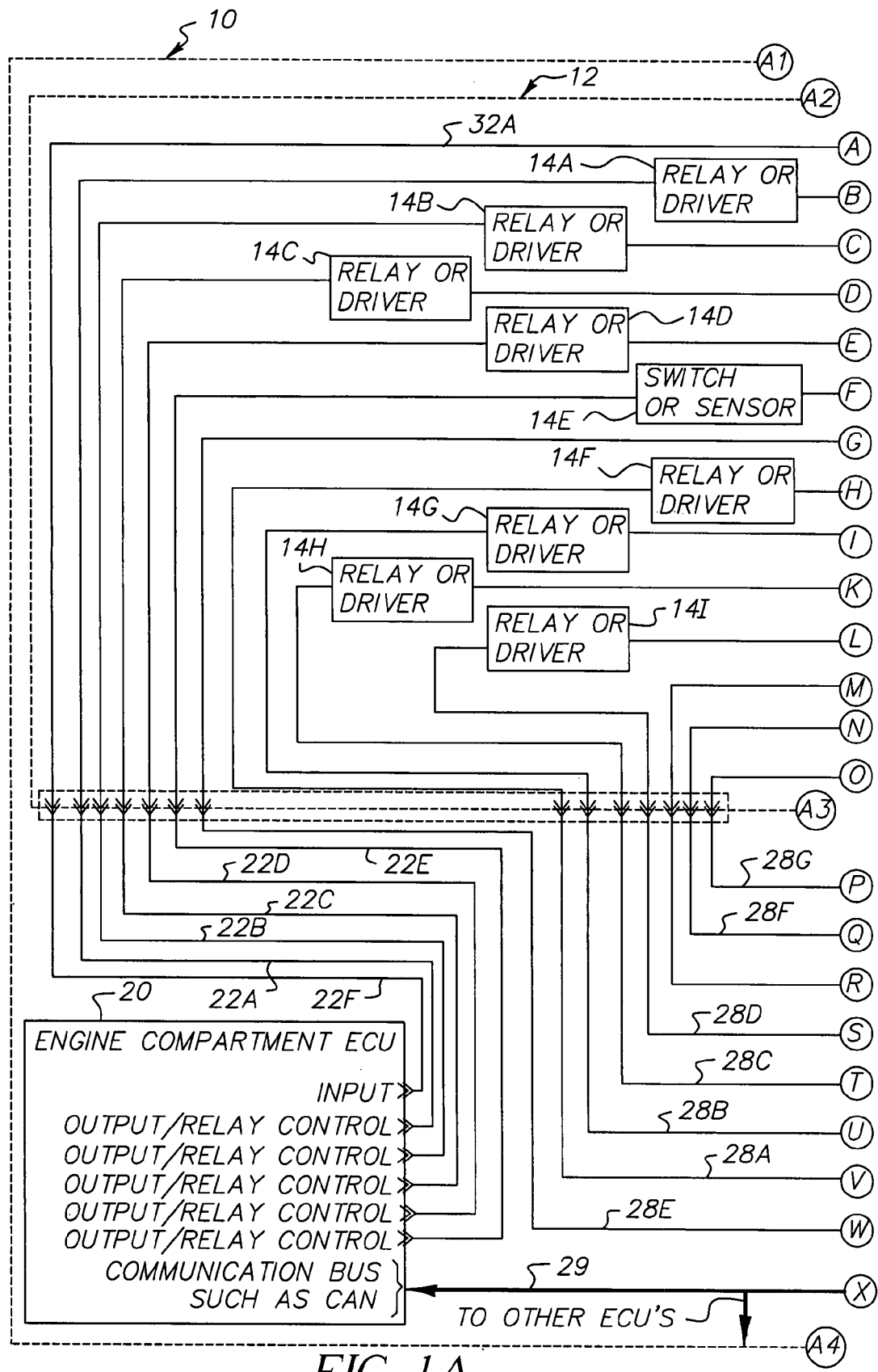
Figure 2A:
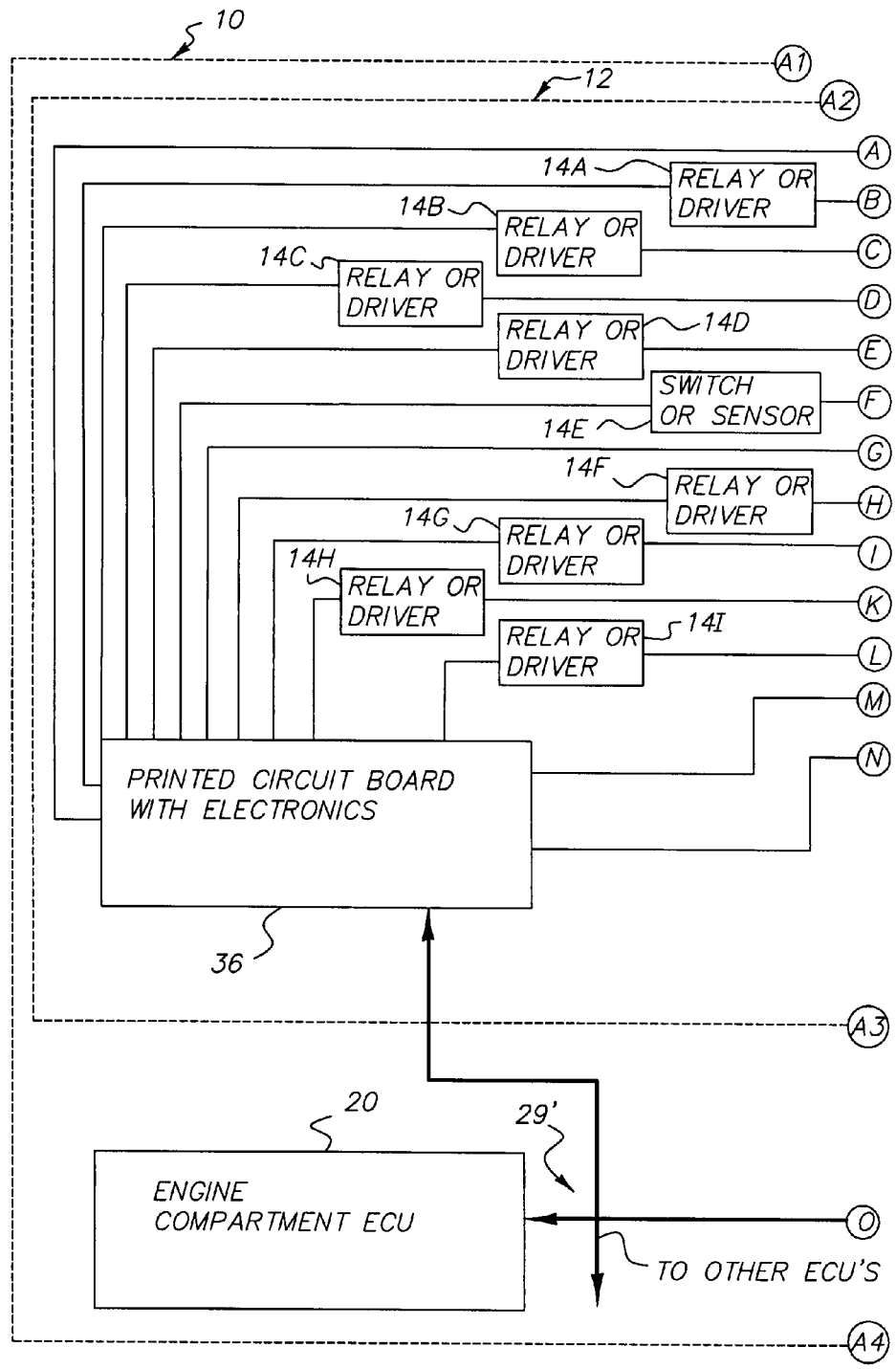
FIGS. 2A and 2B, is a schematic diagram of a fuse/relay box/power distribution system with an internal circuit board and electronics custom to the unit.
Figure 2B:
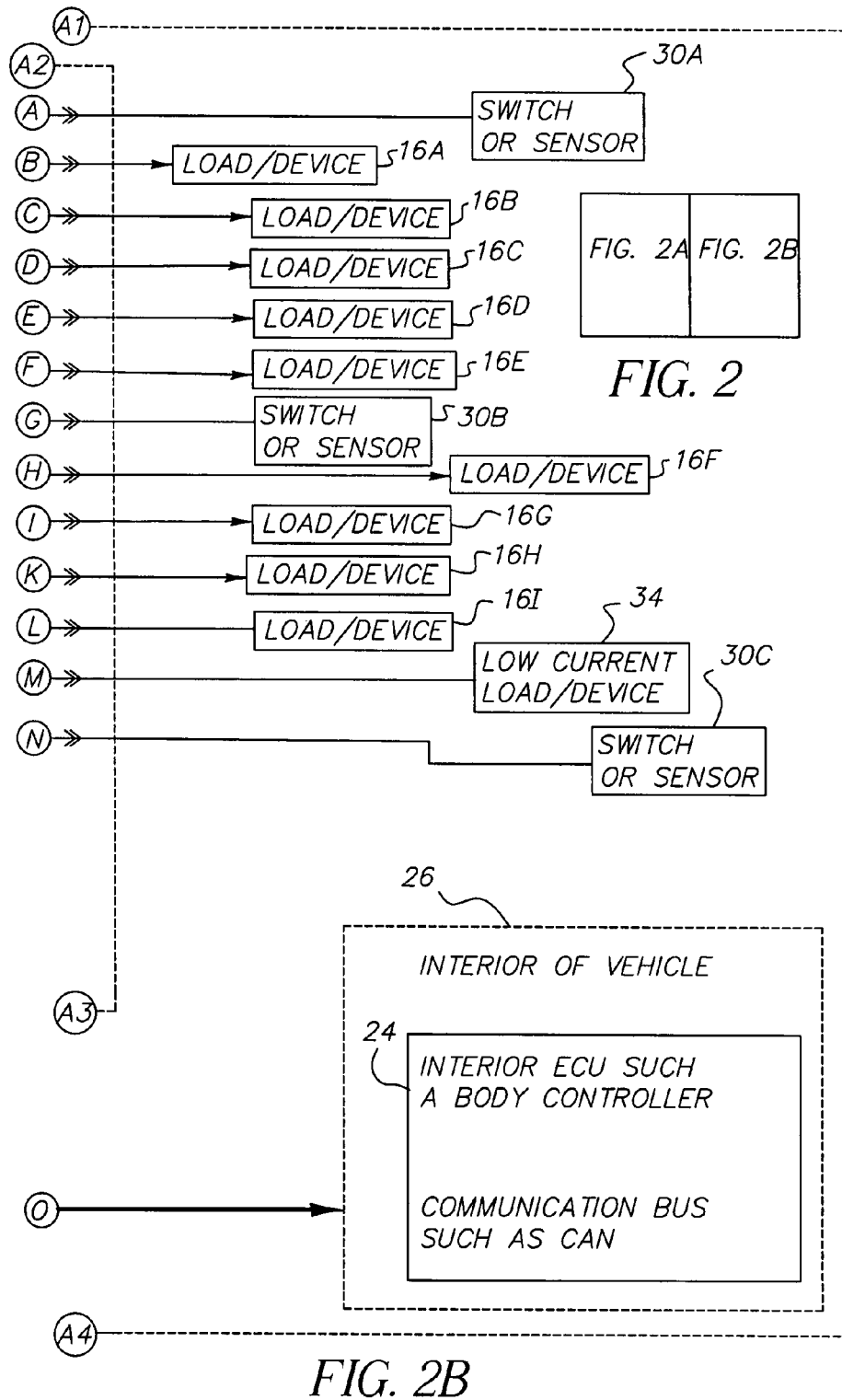
Figure 3A:
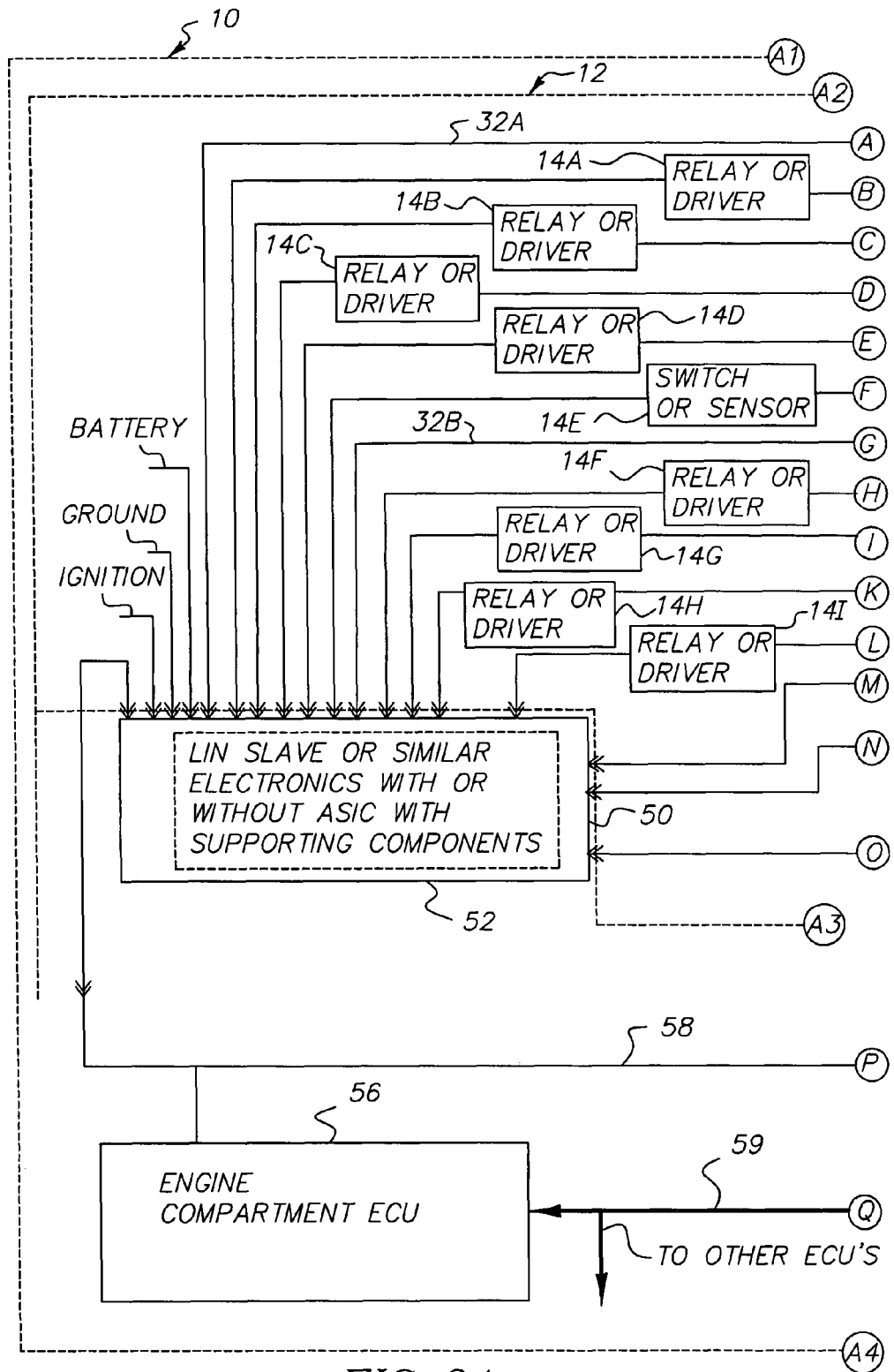
FIGS. 3A and 3B, is a schematic diagram of a power distribution system including the present invention.
Figure 3B:
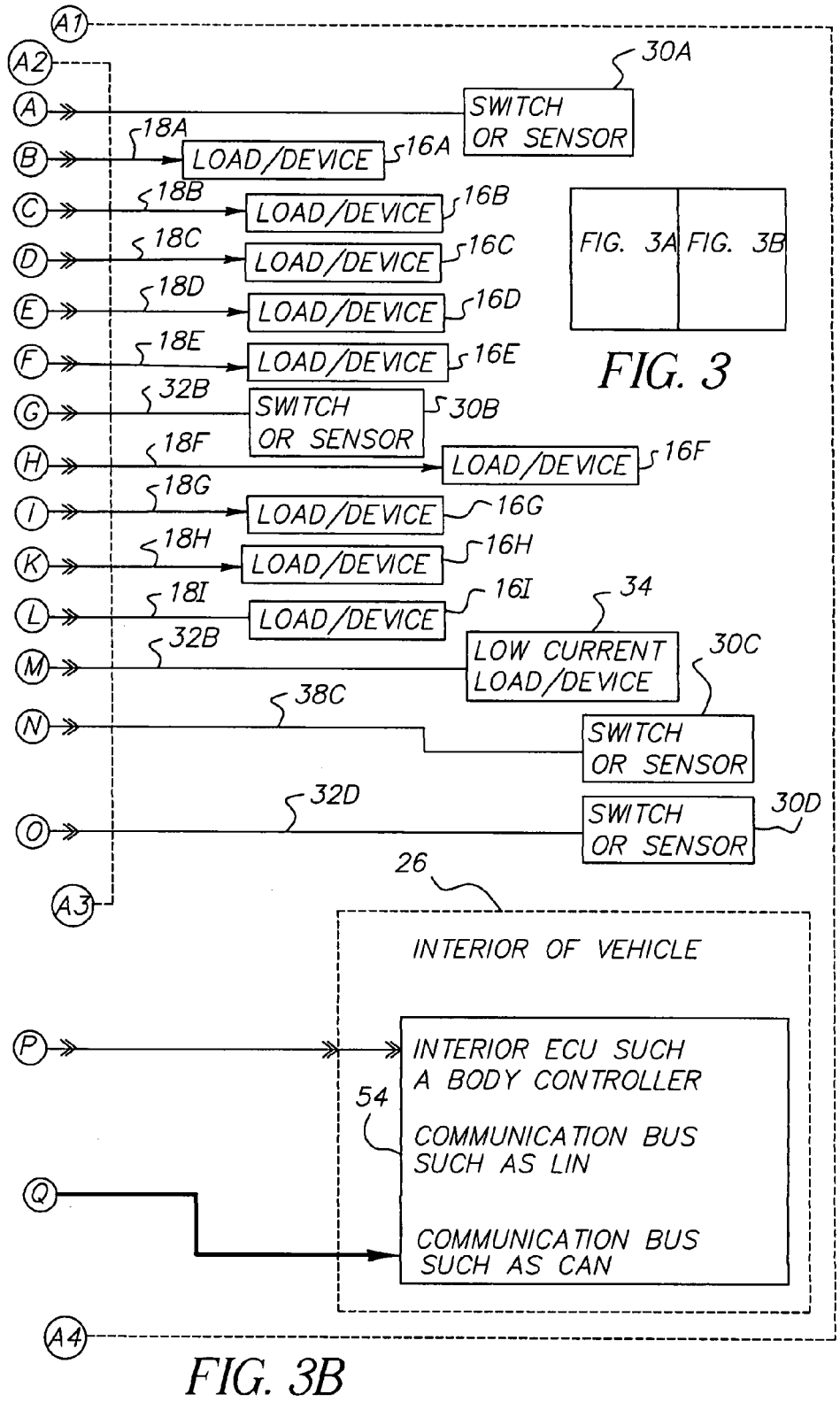

Referring now to FIG. 3, there is shown an automotive vehicle power distribution system incorporating the present invention. As shown, power distribution unit 12 (such as a fuse box, relay box, a power distribution center, a junction block) is located in engine compartment 10 of an automotive vehicle. Unit 12 includes a plurality of relay or driver units 14A-14I which produce outputs to load/devices 16A-16I located outside of unit 12 by means of electrical conductors 18A-18I. Unit 12 also receives signals from switch or sensor units 30A-30D over electrical conductors 32A-32D and transmits an output signal to low current load/device 34 over electrical conductor 32E. According to the invention, the circuit board containing control electronics is eliminated from unit 12 and the control electronics are contained in a housing 50 plugged into unit 12. Moreover, the complex of wiring carrying input signals to unit 12 have been replaced by a commercial which includes standard communication bus, such as a LIN communication bus. Housing 50 includes an electronics assembly 52 (including commercial standard communication bus electronics) which communicates with engine compartment ECU 54 and interior ECU 56 (such as a body controller) through LIN communication bus 58 and CAN communication bus 59. Other commercial standard communication buses can be also used. Electronics assembly 52 is preferably a LIN slave or similar communication bus electronics with or without an ASIC with supporting components.

Figure 4A:
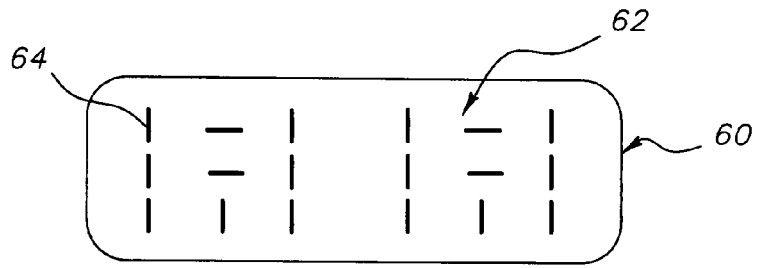
FIGS. 4A and 4B are respectively plan and side views of an embodiment of the present invention.
Figure 4B:
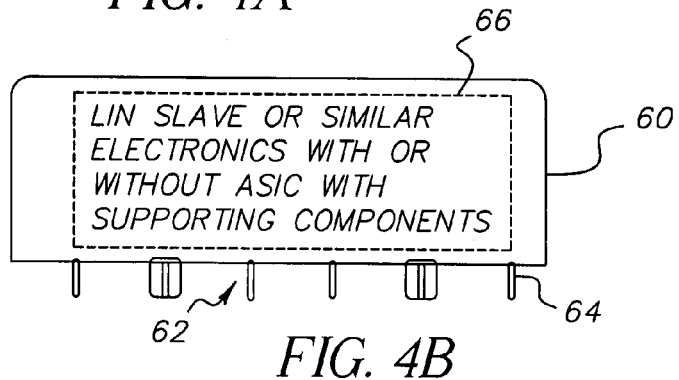

FIGS. 4A and 4B show an embodiment of the present invention using one type of commercial standard dual relay housing 60 having male electrical connector 62 having an commercial standard relay footprint of male electrical contacts 64. Contained within housing 60 is an electronics assembly 66, such as a LIN slave or similar commercial standard communication bus electronics, with or without an ASIC, with supporting components. Electronics assembly 66 is electrically connected to male electrical connector 62.

Figure 5A:
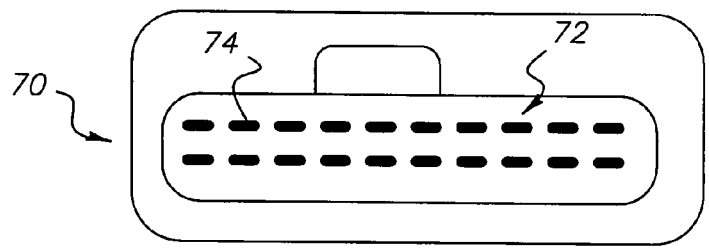
FIGS. 5A and 5B are respective plan and side views of another embodiment of the present invention.
Figure 5B:
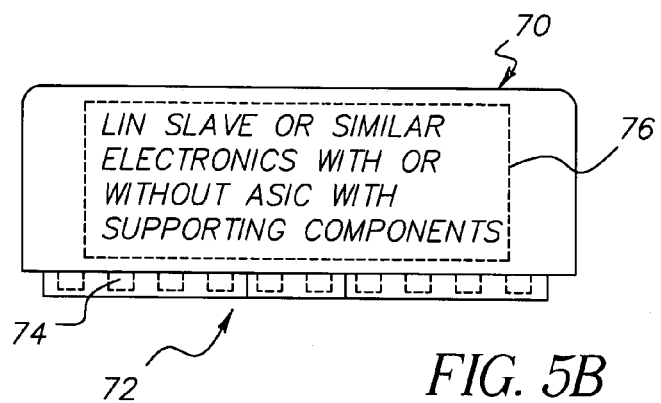

FIGS. 5A and 5B show another embodiment of the present invention using one type of commercial standard wiring connector housing 70 having male electrical connector 72 having an commercial standard wiring connector footprint of male electrical contacts 74. Contained within housing 70 is an electronics assembly 76 such as a LIN slave or similar industry standard communication bus electronics, with or without an ASIC, with supporting components. Electronics assembly 76 is electrically connected to male electrical connector 72.

Figure 6A:
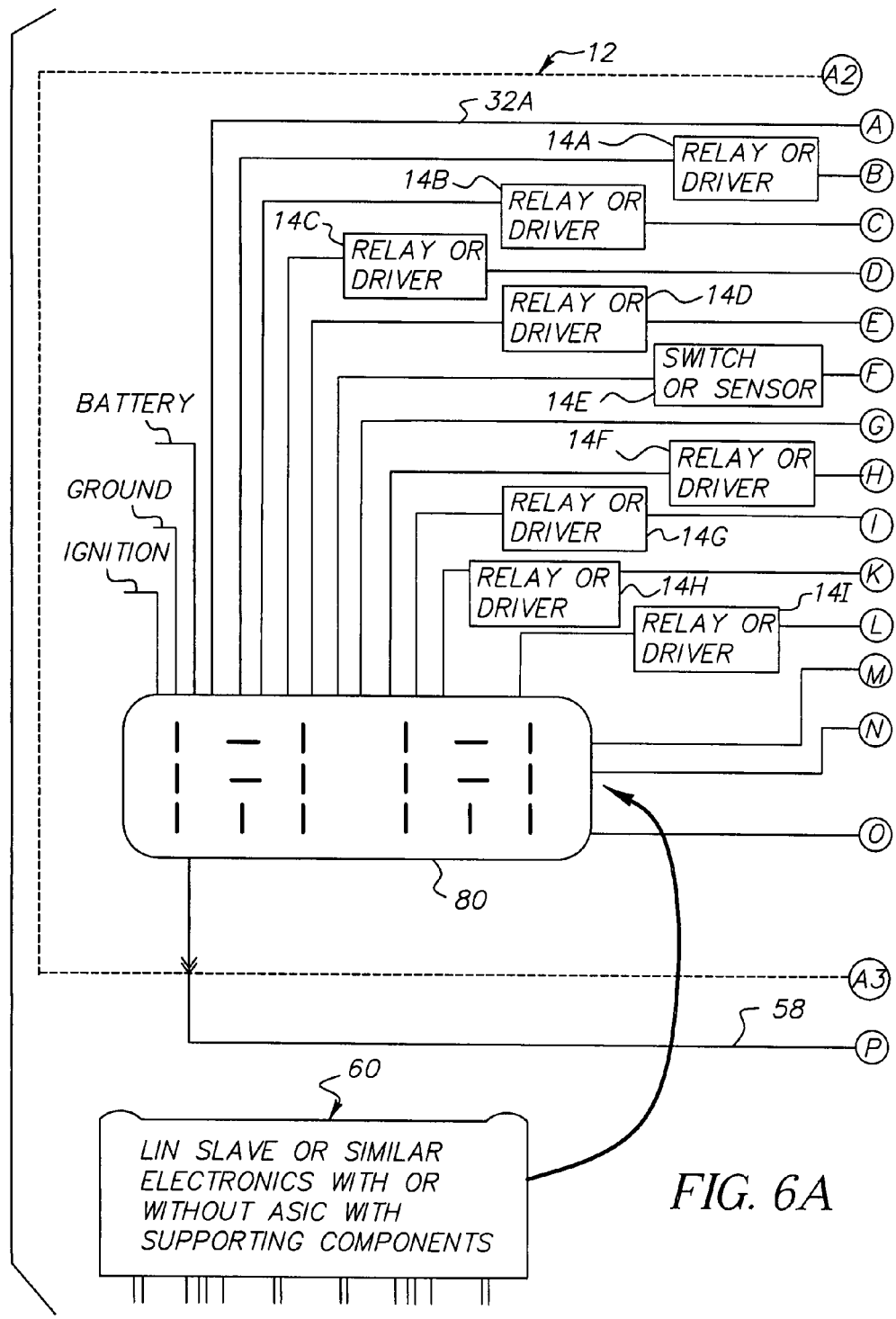
FIGS. 6A and 6B, is a schematic diagram of a power distribution system incorporating the embodiment of FIGS. 4A and 4B.
Figure 6B:
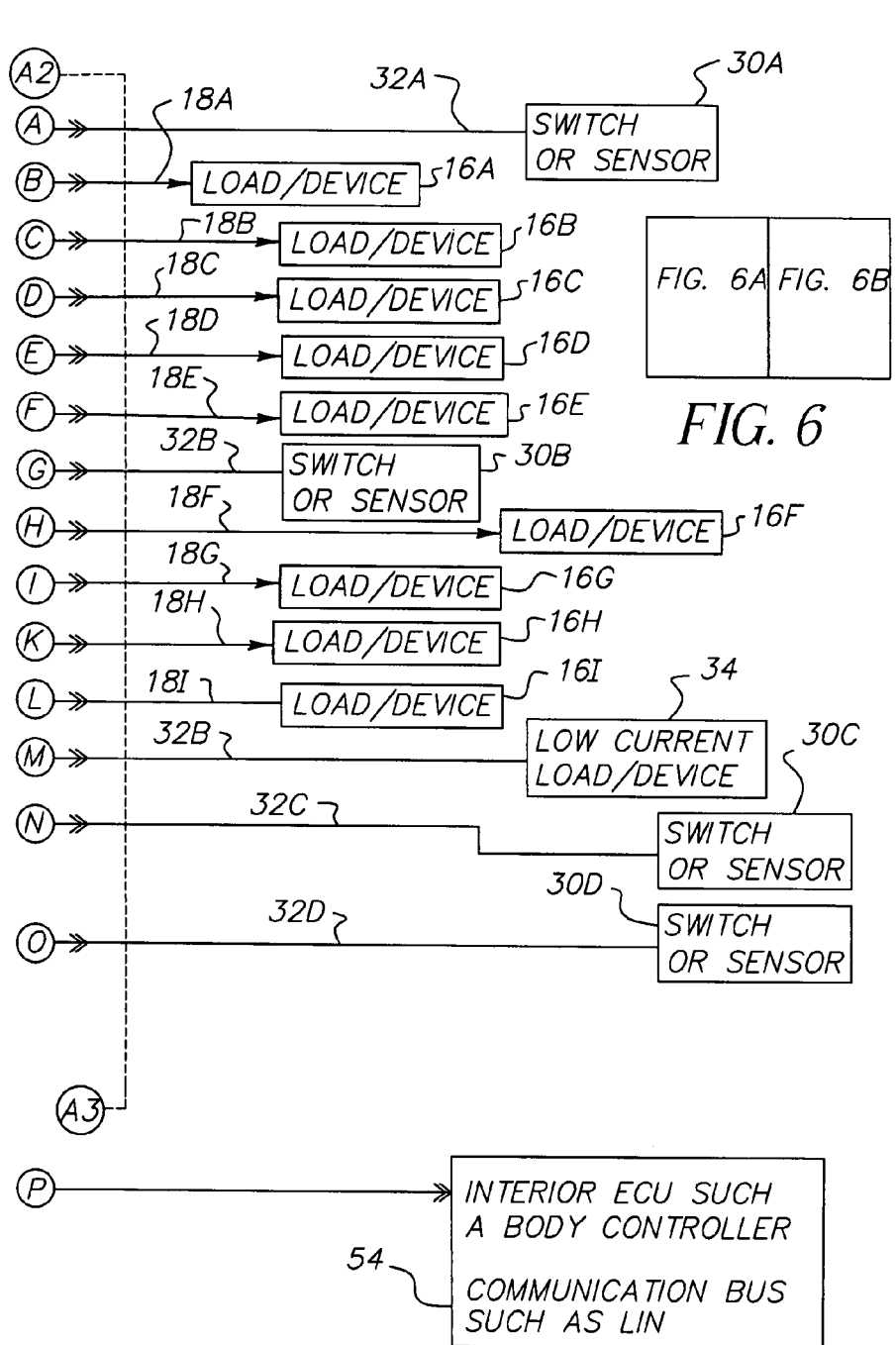
Figure 7A:
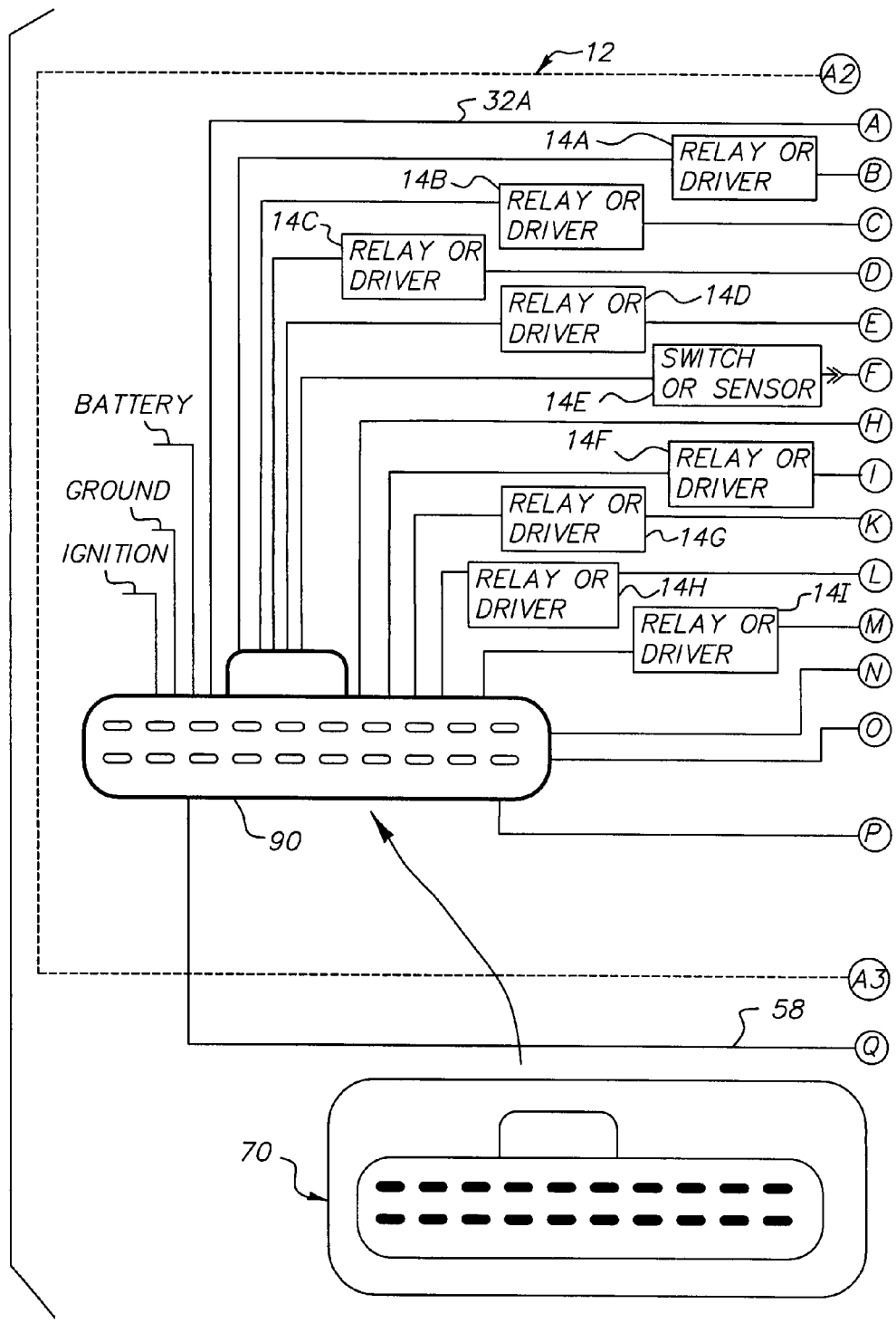
FIGS. 7A and 7B, is a schematic diagram of a power distribution system incorporating the embodiment of FIGS. 5A and 5B.
Figure 7B:
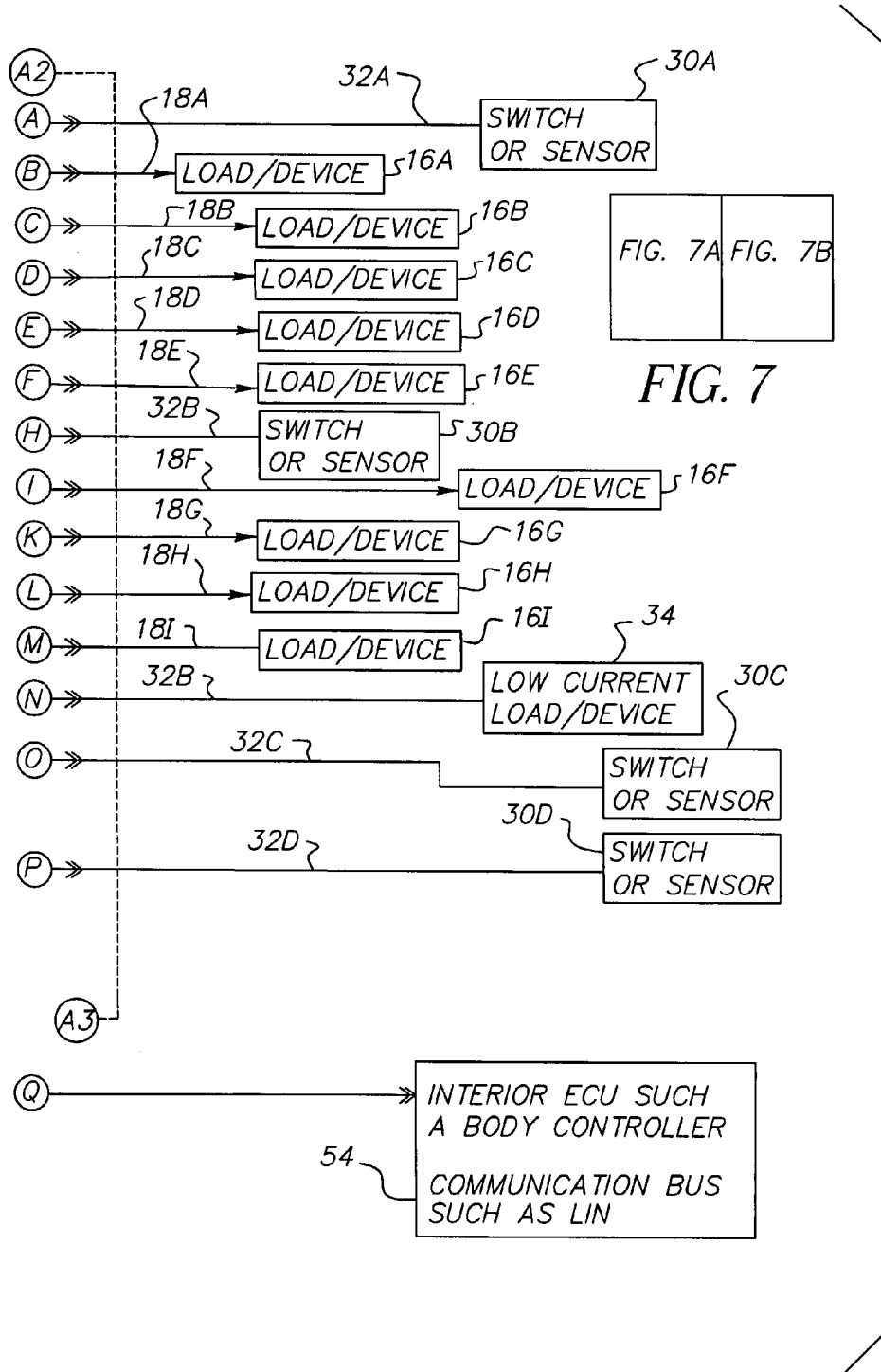

FIG. 6 shows a power distribution unit 12 having a female electrical connector 80 into which embodiment 60 is plugged. FIG. 7 shows a power distribution unit 12 having a female electrical connector 90 into which embodiment 70 is plugged.

The CAN (Controller Area Network) communications bus is a high level network system while the LIN (Local Interconnect Network) communication bus is a small and slow network system that is used as a cheap sub-network of a CAN bus to integrate various devices. LIN is a broadcast serial network comprising a master and many slaves.

Major benefits of the present invention are the utilization of cost effective LIN slave or similar technology to function and communicate between a power distribution unit with other modules without requiring a circuit board in the power distribution unit. Without the need for a circuit board, the power distribution unit can utilize the most cost effective construction such as metal frets, wire or bus bars and standard connections while still saving the wire circuits that would be needed if another module in a different location (such as a body controller) read the inputs and controlled the relays via wires. The invention also reduces the need for a sealed or partially sealed unit, since the electronics are self contained in the plugged in electronics module of the invention. The invention allows scalability and expandability to add control and input capability. An example would be to add the system on a high content vehicle to add capability without needing to have additional capability protected for in the major electronic modules that would not be utilized on lower content vehicles. The invention allows additional protection/isolation if required for higher voltage applications, such as electric or hybrid vehicles, by isolating only to the communication bus circuitry instead of to all the input and control circuits going to the other ECUs if the invention was not used. The invention allows additional diagnostic capability with failsafe modes for the inputs and outputs without needing to reengineer power distribution boxes.

Those skilled in the art can now appreciate from the foregoing description that the broad teachings of the present invention can be implemented in a variety of forms. Therefore, while this invention has been described in connection with particular examples, thereof, the true scope of the invention should not be so limited since other modifications will become apparent to those skilled in the art upon a study of the drawings, specification and the following claims.

What is claimed is:

1. An electronics module for automotive vehicles comprising:
   a housing;
   an electrical connector having a commercial standard electrical connector footprint mounted on said housing; and
   an electronics assembly that is a LIN slave and that includes commercial standard communication bus electronics contained in said housing, said electronics assembly being electrically connected to said electrical connector;
   wherein said electronics module is adapted to be plugged into a power distribution unit of an automotive vehicle in order to control power distribution components of said unit.

2. The module of claim 1 wherein said housing is a commercial standard relay housing and wherein said electrical connector has a commercial standard relay footprint.

3. The module of claim 1 wherein said housing is a commercial standard wiring connector housing and said electrical connector has a commercial standard wiring connector, footprint.

4. The module of claim 1 wherein said electronics assembly of said module receives inputs over a LIN communication bus and produces outputs to a power distribution unit into which the module is plugged to control power distribution components of said power distribution unit.

5. A power distribution system for automotive vehicles comprising:
- a power distribution unit containing power distribution components, such as fuses, relays, and the like;
- an electronics module including:
  - a housing;
  - an electrical connector having a commercial standard electrical connector footprint mounted on said housing;
  - an electronics assembly that is a LIN slave and that includes commercial standard communication bus electronics contained in said housing, said electronics assembly being electrically connected to said electrical connector; and
- an electrical connector mounted on said power distribution unit into which said electronics module is plugged and to which said power distribution components are electrically connected.

6. The system of claim 5 wherein said electronics module housing is a commercial standard relay housing and wherein said electrical connector has a commercial standard relay footprint.

7. The system of claim 5 wherein said electronics module housing is a commercial standard wiring connector housing and said electrical connector has a commercial standard wiring connector footprint.

8. The system of claim 5 wherein said electronics assembly of said module receives inputs over a LIN communication bus and produces outputs to said power distribution unit into which the module is plugged to control power distribution components of said power distribution unit.

* * * * *